United States Patent [19]

Matsumoto et al.

[11] Patent Number: 5,002,666
[45] Date of Patent: Mar. 26, 1991

[54] FILTER ELEMENT AND MANUFACTURE METHOD THEREOF

[75] Inventors: Noriya Matsumoto, Okazaki; Hajime Akado, Anjo; Yoshihiko Oya, Kariya; Yoshihiro Taki, Nagoya; Shuji Yamaguchi, Toyokawa, all of Japan

[73] Assignee: Nippondenso Co., Ltd., Kariya, Japan

[21] Appl. No.: 376,290

[22] Filed: Jul. 6, 1989

[30] Foreign Application Priority Data

Jul. 8, 1988 [JP] Japan ................................ 63-171315

[51] Int. Cl.⁵ ............................................ B01D 67/00
[52] U.S. Cl. .............................. 210/321.61; 210/321.8;
210/321.89; 210/500.23
[58] Field of Search ................. 210/487, 321.6, 321.61,
210/321.72, 321.78–321.8, 321.87–321.89,
500.23, 323.2; 264/41, DIG. 48, DIG. 62

[56] References Cited

U.S. PATENT DOCUMENTS 2,042,564  6/1936  Sweetland .
2,576,864  11/1951 Valente .
2,599,604  6/1952  Bauer et ál. .
4,756,835  7/1988  Wilson ............................. 210/652

FOREIGN PATENT DOCUMENTS 58-11020  1/1983  Japan .
60-18337  1/1985  Japan .
61-50612  11/1986 Japan .

Primary Examiner—Frank Sever
Attorney, Agent, or Firm—Cushman, Darby & Cushman

[57] ABSTRACT

A filter element which is improved in filter performance and suitable for use in various types of filters. In the filter element, a multiplicity of tubes each formed of a filtering material and having a substantially circular shape in cross-section are arranged side by side into a tubular assembly with the axes of the tubes lying parallel to one another; inter-tube openings are closed at one end of the tubular assembly which end serves as the inlet side for a fluid to be filtered, whereas intra-tube openings are closed on the opposite end of the tubular assembly; and the total cross-sectional area of all the inter-tube openings, is set smaller than the total cross-sectional area of all the intra-tube openings, but larger than the minimum cross-sectional area of a path through which the fluid is supplied to the tubular assembly. Specifically, one or more filtering materials including a plurality of tubes each having a substantially circular shape in cross-section and connecting portions to interconnect the adjacent tubes are rolled into a spiral shape to provide the tubular assembly with the axes of the tubes arranged side by side parallel to one another.

20 Claims, 13 Drawing Sheets

FILTER ELEMENT AND MANUFACTURE METHOD THEREOF

BACKGROUND OF THE INVENTION

The present invention relates to a filter element suitable for use in various types of filters such as a vehicle fuel filter and oil filter, for example, and a manufacture method thereof.

For improvement of filter performance, instead of conventional filter elements formed by bending a sheet-like filtering material into the shape of flower leaves or a chrysanthemum in cross-section, there are proposed filter elements of honeycomb structure having an larger effective filtration area per unit volume.

For example, Japanese patent Publication No. 61-50612 or U.S. Pat. No. 2,599,604 discloses a filter element which is fabricated by fusing a flat filtering material and a corrugated filtering material to each other, and then rolling the assembly into a spiral shape to provide a cylindrical laminate with a number of small through holes.

In the filter element thus constructed, as shown in FIG. 36, one end face of the cylindrical laminate is sealed off at inlets of flow passages 91 defined by valley-like portions 71 of a corrugated filtering material 7 and a flat filtering material 8, whereas the other end face thereof is sealed off at outlets of flow passages 92 defined by mountain-like portions 72 of the corrugated filtering material 7 and the flat filtering material 8, while leaving the outlets of the flow passages 91 open. A fluid to be filtered is introduced to the inlets of the passages 92, and the cleaned filtrate is then taken out from the outlets of the passages 91 after passing through the filtering materials 7, 8 for filtration.

However, the above-mentioned structure of the prior art has a disadvantage. The differential pressure between the flow passages 92 on the inlet side and the flow passages 91 on the outlet side is so increased due to such factors as the pressure of the fluid to be filtered or clogging of the filtering materials that the flat material 8 is deformed (as indicated by dotted lines in FIG. 37). This narrows and even blocks the flow passages 91 on the outlet side, resulting in degradation of filter performance.

Another problem is in that when rolling the filtering materials together into a spiral shape, the flow passages may be collapsed because of a difference in circumferential length between the inner-side flat filtering material 8 and the outer-side corrugated filtering material 7.

SUMMARY OF THE INVENTION

The present invention is to solve the problems as set forth above, and has for its object to provide a filter element which has good filter performance and is free from such disadvantages as deformation of filtering materials and blockade of the flow passages caused by an increase in the fluid pressure or the differential pressure. Another object is to prevent collapse of the filtering materials when rolled into a spiral shape, and to make full use of the volume occupied for further improving the filter performance.

The present invention provides a filter element wherein:

a multiplicity of tubes each formed of a filtering material and having a substantially circular shape in cross-section are arranged side by side into a tubular assembly with the axes of the tubes lying parallel to one another;

inter-tube openings are closed at one end of the tubular assembly which end serves as the inlet side for a fluid to be filtered, whereas intra-tube openings are closed on the opposite end of the tubular assembly; and the total cross-sectional area of all the inter-tube openings is set smaller than the total cross-sectional area of all the intra-tube openings, but larger than the minimum cross-sectional area of a path through which the fluid is supplied to the tubular assembly.

In FIGS. 1 and 2, the filter element comprises two sheets of corrugated filtering materials 1, 2 which are joined to each other at respective valley or bottom portions 12 and 22. The joined filtering materials are rolled into a spiral shape to provided a tubular assembly which has a multiplicity of fluid passages 3 having a substantially circular shape in cross-section and arranged side by side with their axes lying parallel to each other. The tubular assembly has one end face where inter-openings, i.e., those openings left between the fluid passages 3 are sealed at 52, and another end face where the fluid passages 3 intra-openings are closed.

As to the corrugated filtering materials, 1, 2, mountain or top portions 11 of the filtering material 1 lying on the inner side, is set to have a circumferential length smaller than mountain or top portions 21 of the filtering material 2 lying on the outer side.

By changing the spacing between the fluid passage dependent on the inner end and outer sides of the spiral shape such that the adjacent fluid passages 3 are arranged to be in contact with each other, the effective filtration area can be increased.

Preferably, the total cross-sectional area of all the inter-tube openings is set smaller than the total cross-sectional area of all the intra-tube openings, but larger than the minimum cross-sectional area of an inlet path through which the fluid flows.

Further, as shown in FIG. 10, the two sheets of filtering materials 1, 2 may be partially joined to each other via bonding regions 51 while leaving non-bonded regions 19 between the respective bottom portions 12 and 22.

In addition, the tubular assembly may be formed by bending one sheet of filtering material to provide a plurality of superposed portions and connecting portions to interconnect the adjacent superposed portions, and then spreading out the superposed portions into a tubular shape.

The fluid pressure is radially exerted on the tube wall as indicated by arrows in FIG. 11. The present invention has been made with such a characteristic in mind. Thus, because of the fluid passage 3 having a substantially circular shape in cross-section, even if the pressure of the fluid to be filtered or the differential pressure between interior and exterior of the fluid passage 3 is increased, the resulting forces will be evenly applied to the wall of the fluid passage 3 and hence the fluid passage 3 will not deform.

Moreover, by setting the total cross-sectional area of all the inter-tube openings larger than the minimum cross-sectional are of the inlet fluid path, the fluid is not disturbed in its flow and the surface area of the fluid passages is kept large for improving the filtering efficiency.

Since the peripheral length of the inner side of the mountain portion 11 is shorter than that of the outer side thereof, the filtering material can be spirally wound appropriately because of the presence of the peripheral length difference having been previously provided between the outer and inner sides so that no collapse of the fluid passages occurs.

As an alternative, the tubular assembly can be formed easily using one sheet of filtering material, and this permits simplifying the manufacturing.

With the present invention, the fluid passages each having a substantially circular shape in cross-section makes it possible to avoid any deformation of the filtering materials otherwise caused by an increase in the fluid pressure or the differential pressure, thereby providing the filter element with good performance.

With the arrangement that the mountain portions of the filtering material lying on the inner side, are set to have a shorter circumferential length, the fluid passages can be prevented from collapsing, and this facilitates the rolling work of the filtering materials into a spiral shape.

With the fluid passages lying closely contiguous to each other, a larger number of fluid passages can be accommodated per unit volume and hence the filtering efficiency is improved.

Further, with the arrangement that the adjacent fluid passages are arranged to be in contact with each other, or that the two sheets of filtering materials, which constitute the filter element together, are partially joined to each other, the effective filtration area per unit volume can be increased to further enhance filter performance.

It is also possible to easily fabricate the tubular assembly using one sheet of filtering material, while simplifying the manufacture steps.

BRIEF DESCRIPTION OF THE DRAWINGS

FIGS. 1 to 5 illustrate one embodiment of the present invention in which;

FIG. 1 is an overall perspective view of a filter element of the present invention;

FIG. 2 is a fragmentary sectional view of the filter element;

FIG. 3 and 4 are views showing manufacture steps; and

FIG. 5 is a view showing operation of the filter element of the present invention;

FIGS. 19 to 21 illustrate a fifth embodiment of the present invention in which FIG. 19 is an overall perspective view of the filter element of the present invention, and FIGS. 20 and 21 are views showing the manufacturing process of the filter element of FIG. 19;

DETAILED DESCRIPTION OF EMBODIMENTS

Hereinafter, the present invention will be described with reference to illustrated embodiments.

Figure 12:
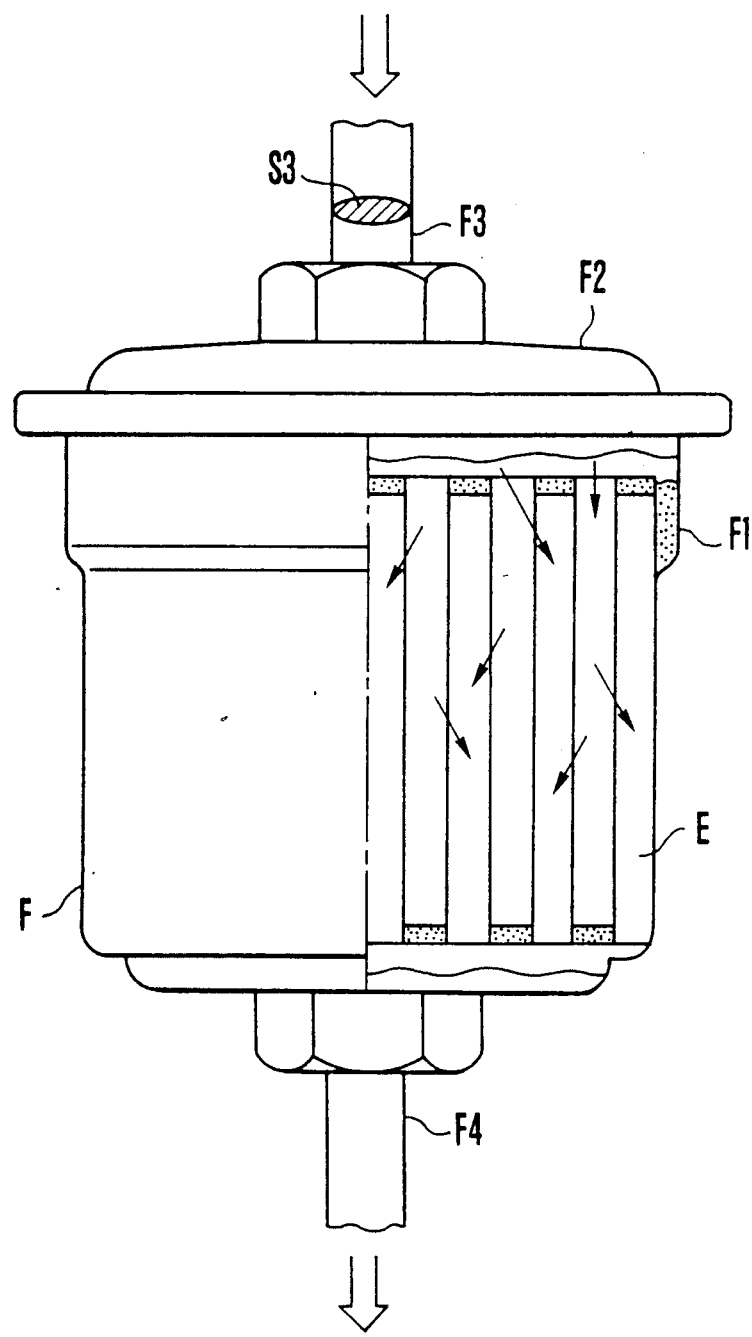
FIG. 12 is an overall view showing the construction of a fuel filter in which the present invention is incorporated.

FIG. 12 shows a fuel tank disposed midway a fuel line for supplying fuel to an engine. A filter element E of the present invention, described later in detail, is housed in a filter case F made of iron or resin. The filter element E has the upper end fixedly bonded at its outer periphery to an inner wall of the filter case F by means of an adhesive F1. The filter case F is covered with a cover F2 from above, which is fixed at its outer periphery to the upper end opening of the filter case F by caulking.

Fuel is introduced into the fuel filter from an inlet port F3 disposed at the center of the cover F2 for being filtered through the filter element E, and then supplied to an engine (not shown) from an outlet port F4 disposed at the bottom surface of the filter case F.

Figure 1:
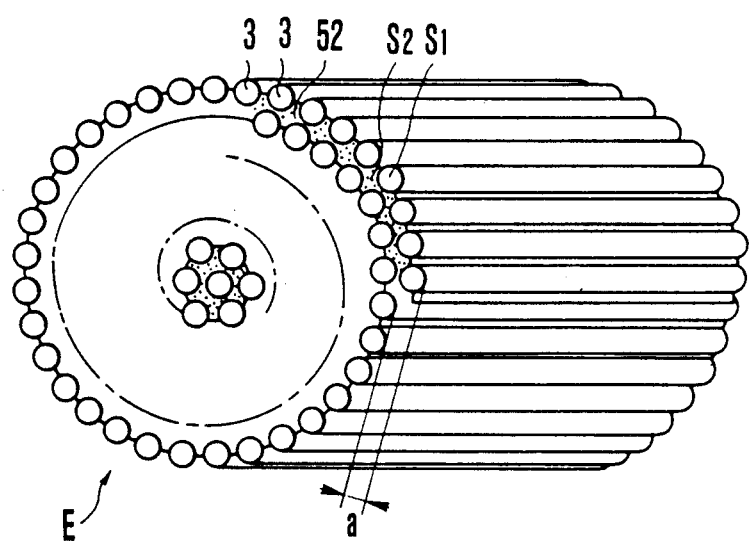

FIG. 1 shows the filter element E of the present invention in a perspective view. As shown, the filter element E has a cylindrical shape, and includes a multiplicity of fluid passages 3 each having a circular shape in cross-section and arranged side by side parallel to one another in the axial direction thereof. The filter element E is manufactured as follows through the process shown in FIG. 3 and 4.

Figure 3:
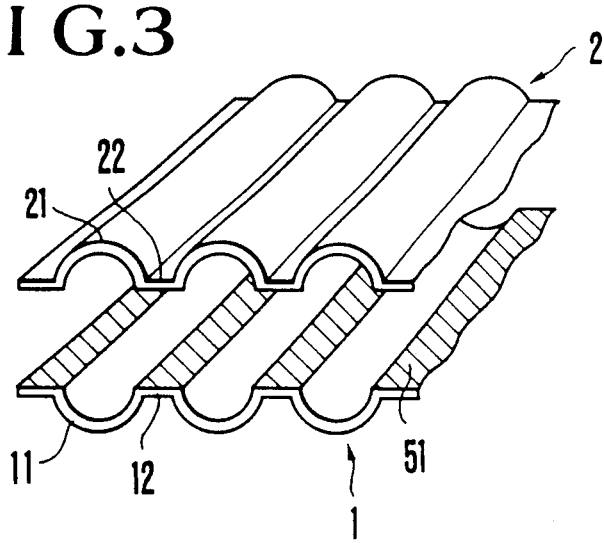

The filter element E comprises, as shown in FIG. 3, two sheets of corrugated filtering materials 1, 2, formed by a corrugated roller or the like to have mountain or top portions 11, 21, each having a substantially semicircular cross-section, and flat valley or bottom portions 12, 22 lying alternatively, respectively. The corrugated filtering material 1, 2 are each made of any desired material such as filter paper, non-woven cloth, wire netting, or synthetic fabric. Because the flow rate of fuel to be filtered through the fuel filter is lower than that of a fluid to be filtered through other oil filters or the like, the filtering materials 1, 2 with a thickness as thin as 0.14 mm can be employed.

Figure 4:
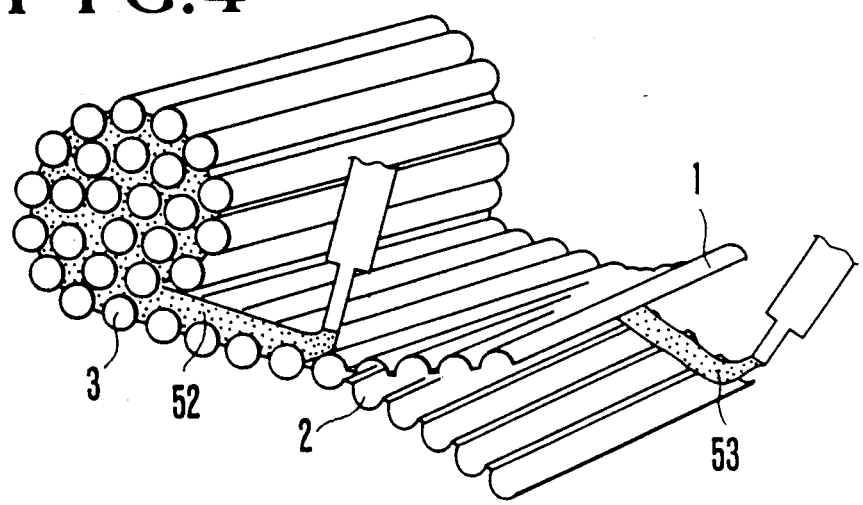

The corrugated filtering materials 1, 2 are laid one above the other, and their valley portions 12, 22 are then joined to each other using an adhesive 51 to define tubular spaces (or tubes) surrounded by the respective mountain portions 11, 21, those tubular spaces serving as the fluid passages 3. The filtering materials 1, 2 thus superposed are rolled, as shown in FIG. 4, in a direction transverse to the axes of the fluid passages 3, thereby providing the filter element E in a spiral shape. On this occasion, an adhesive 52 is applied onto the outer peripheries of the fluid passages 3 at one end face of the filter element E on the side where fuel is introduced, thereby sealing the openings left between the fluid passages 3. At the other end face, an adhesive 53 is filled in the openings of the fluid passages 3 to close them. Thus, there are formed the fluid passages 3 open at the fuel inlet side and closed at the opposite side, as well as filtrate passages 31, defined between the fluid passages 3, closed at the fuel inlet side and open at the opposite side (see FIG. 5).

With the above arrangement, the total value $\Sigma S_1$ of cross-sectional areas $S_1$ of the fluid passages 3 shown in FIG. 1 can be made much larger than the total value $\Sigma S_2$ of cross-sectional areas $S_2$ of the openings surrounded by the fluid passages 3 as compared with the prior art, because of the fluid passages 3 each having a tubular shape. This increases the total surface area of the fluid passages 3 and improves the filtering capacity to a large extent. Reversely stated, if there is no need of enhancing the filtering capacity, the entire size of the filter element can be made smaller by reducing the number of fluid passages 3.

However, the total value $\Sigma S_2$ of cross-sectional areas $S_2$ of the openings surrounded by the fluid passages 3 must be larger than the minimum cross-sectional area $S_3$ of the inlet port F3 through which fuel is supplied to the fuel filter, or the outlet port F4, etc. The reason is to avoid the likelihood of disturbing a flow of the fuel (fluid) through the flow of passages 3.

Figure 13:
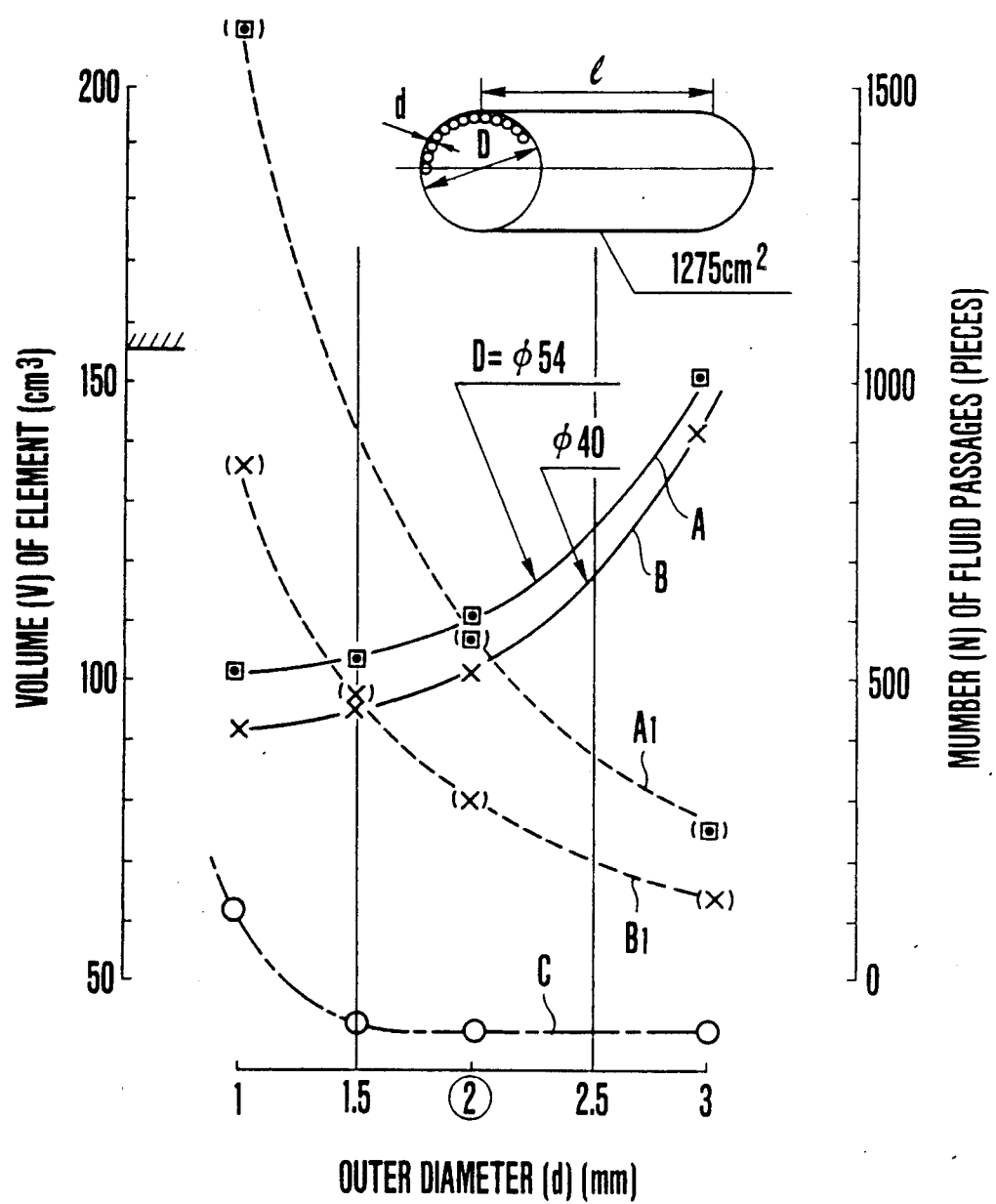
FIG. 13 is a characteristic graph showing the relationship of the volume, number and pressure loss with respect to the outer diameter of the fluid passages.

The size of outer diameter d of the fluid passage 3 will now be considered by referring to FIG. 13. In FIG. 13, the horizontal axis represents the outer diameter d (mm), whereas the vertical axis represents the element volume V (cm$^3$) and the number of fluid passages N. Here, solid lines A, B indicate curves for the element volume, broken lines $A_1$, $B_1$ curves for the number of fluid passages, and one-dot chain line C a curve representing pressure loss in the fluid passage.

As will be apparent from FIG. 13, as the outer diameter d of the fluid passage 3 is set smaller, the total surface area can be increased and hence the element volume V can be reduced as indicated by the solid lines A, B. As indicated by the broken lines A1, B1, however, the number of fluid passages N must be augmented and this drastically increases the number of steps necessary in manufacture. It has also been found that the pressure loss in the fluid passage starts increasing when the outer diameter of the fluid passage is reduced down smaller than 1.5 mm, as indicated by the one-dot chain line C.

Taking into account the above factors of the element volume V, the number of fluid passages N and the pressure loss, the highest efficiency is found in a range of from 1.5 mm to 2.5 mm of the outer diameter d of the fluid passage.

Figure 2:
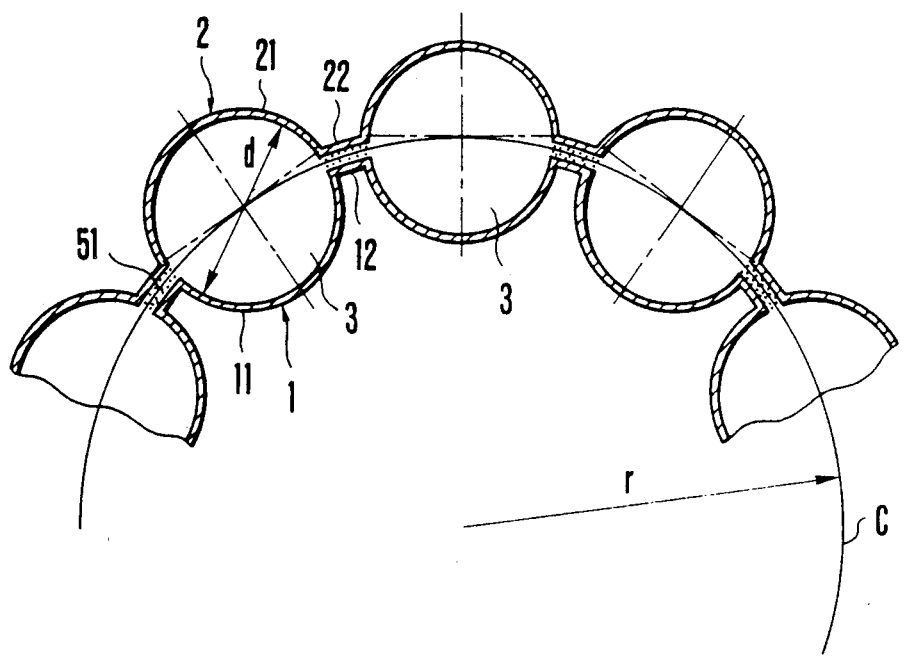

Further, as shown in FIG. 2, the filter element E is arranged such that the mountain portions 11 of the filtering material 1 lying on the inner side, when rolled into a spiral shape, each have a circumferential length smaller than the mountain portions 21 of the filtering material 2 lying on the outer side. In other words, the circumferential lengths of the mountain portions 11, 21 are set such that the joined portions between the corrugated filtering materials 1, 2 lie on a circle C defined by the spiral radius r.

Figure 5:
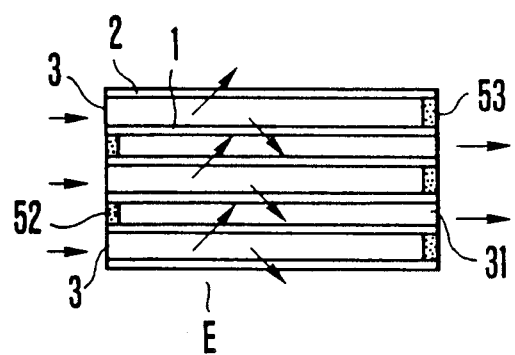

Operation of the filter element E thus fabricated will now be described with reference to FIG. 5. Fuel is introduced into the fluid passages 3 as indicated by arrows in the figure, and filtered while passing through the corrugated filtering materials 1, 2. Between the fluid passages 3, there are defined filtrate passages 31 sealed at the fuel inlet side so that cleaned fuel is supplied to an engine through the filtrate passages 31.

At this time, since the fluid passages are each formed to have a substantially circular shape in cross-section, it is possible to avoid any deformation of the fluid passages 3 due to the raised pressure of the fluid to be filtered or an increase in the differential pressure between interior and exterior of the fluid passages 3 caused by clogging of the filtering materials, thereby preventing degradation of filter performance. Also, since the mountain portions 11, 21 of the corrugated filtering materials 1, 2 are set to have their circumferential lengths corresponding to the spiral radius r in this embodiment, the fluid passages will not be deformed or collapsed at their outer peripheral portions when rolled into a spiral shape. This makes full use of the volume occupied and further improves filter performance.

Figure 6:
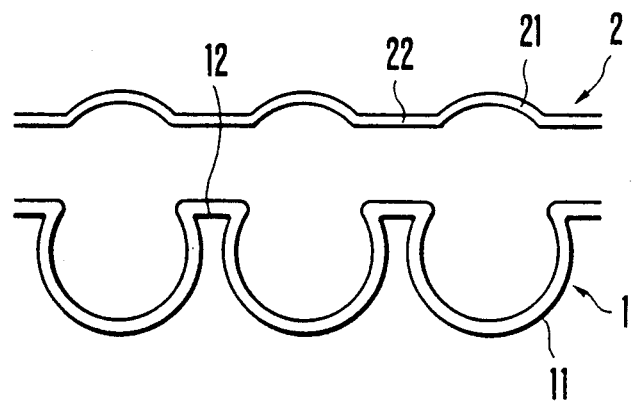
FIGS. 6 and 7 are fragmentary enlarged views of the filter element showing a second embodiment of the present invention.
Figure 7:
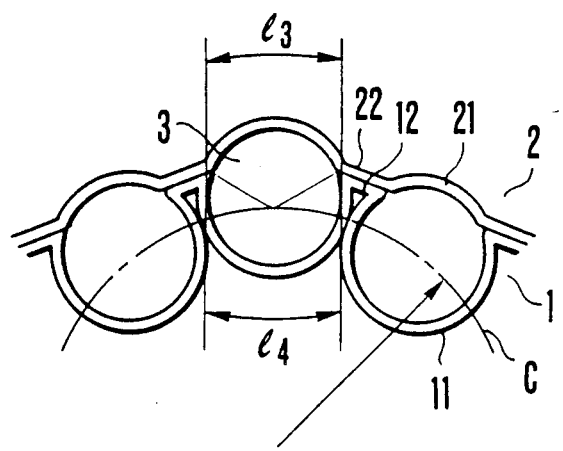

FIGS. 6 to 8 show a second embodiment of the present invention.

In the above first embodiment, the joined portions of the corrugated filtering materials 1, 2, i.e., the valley portions 12, 22 thereof, are arranged to lie on the circle C defined by the spiral radius r, so the adjacent fluid passages 3 on both sides of each joined portions will not contact each other. However, in the second embodiment, locating the joined portions on the outer (or inner) side of the circle C defined by the spiral radius r can bring about a structure in which all adjacent fluid passages 3 are in close contact with each other.

In FIG. 6, the outer-side corrugated filtering material 2 has the mountain portions 21 with height lower than the mountain portions 11 of the inner-side corrugated filtering material 1. Thus, the mountain portions 11, 21 of the corrugated filtering 1, 2 are set in both their shapes and circumferential lengths such that the joined portions of the corrugated filtering materials 1, 2 lie on the outer side of the circle C defined by the spiral radius r, when the corrugated filtering materials are folded into a spiral shape with the filtering material 1 lying on the inner side (see FIG. 7).

With the above structure, the openings or clearances between each of the adjacent fluid passages 3 are reduced and the density of fluid passages 3 per unit volume is augmented to greatly increase the effective filtration area. On the contrary, less volume is required to realize the filter performance equivalent to the prior art, resulting in the reduced size and weight of the filter element.

Figure 8A:
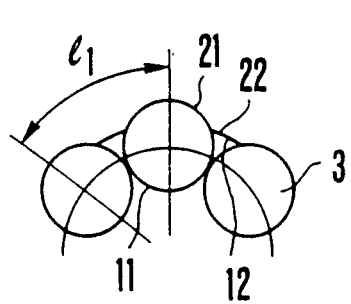
FIGS. 8A and 8B are schematic views showing the state of fluid passages 3 on the inner and outer peripheral sides of a tubular assembly in the second embodiment, respectively.
Figure 8B:
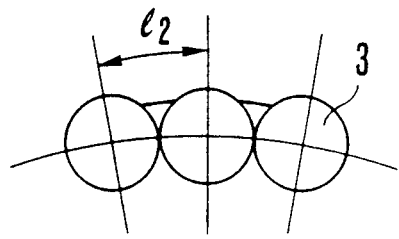

Further, when the filtering materials 1, 2 are rolled into a spiral shape, the radius of curvature becomes larger toward the outer periphery such that the inner side spiral has the smaller radius of curvature, as seen from FIGS. 8A and 8B. It is, therefore, required for the part of the filtering material 2 rolled into the inner side to have a larger length $l_1$ between the adjacent mountain portions 21 than $l_2$ for the part thereof rolled into the outer side.

Accordingly, in this embodiment, an arcuate length $l_4$ of the mountain portion 11 of the filtering material 1 and an arcuate length $l_3$ of the mountain portion 21 of the filtering material 2, as indicated in FIG. 7, are set following the Table 1 below.

TABLE 1

| $l_3$ (mm) | $l_4$ (mm) | Number of Tubes |
|---|---|---|
| 2.0 | 4.7 | 249 |
| 2.1 | 4.6 | 58 |
| 2.2 | 4.5 | 20 |
| 2.4 | 4.3 | 14 |
| 3.1 | 3.6 | 9 |

Specifically, by changing the relationship between the arcuate length l3 and the arcuate length l4 dependent on the specified number of tubes (tubular spaces) during the rolling step sequentially from the inner side, it is possible to eliminate the clearance between the adjacent fluid passages 3 at maximum, and hence roll the fluid passages into a spiral shape closely.

Figure 9:
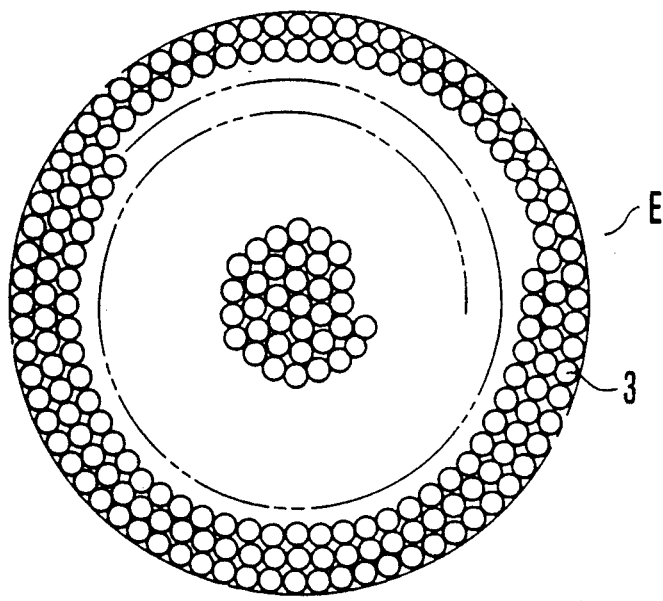
FIG. 9 is a sectional view of the filter element showing a third embodiment of the present invention.

FIG. 9 shows a third embodiment of the present invention. In this embodiment, the fluid passages 3 are designed in their array beforehand such that the outer periphery of the filter element E becomes a substantially true circle, and the shapes and circumferential lengths of the mountain portions 11, 21 are set corresponding to that design. When rolling the filtering materials into a spiral shape, the fluid passages 3 are so controlled in their positions that the outer periphery of the filter element E presents a substantially true circle.

The first embodiment shown in FIG. 1 causes a step difference a at the end position of the rolled filtering materials, and the outer periphery of the filter element will not come into a perfectly close contact with the inner peripheral surface of the filter case when the filter element is housed in the case, thereby making it often difficult to carry out the sealing work. In this embodiment, however, since the outer periphery of the filter element has a substantially true circle, the outer periphery of the filter element is allowed to perfectly closely contact with the inner periphery surface of the filter case, with the result that the sealing work is facilitated. This also enables to effectively utilize the space in the case.

Figure 10:
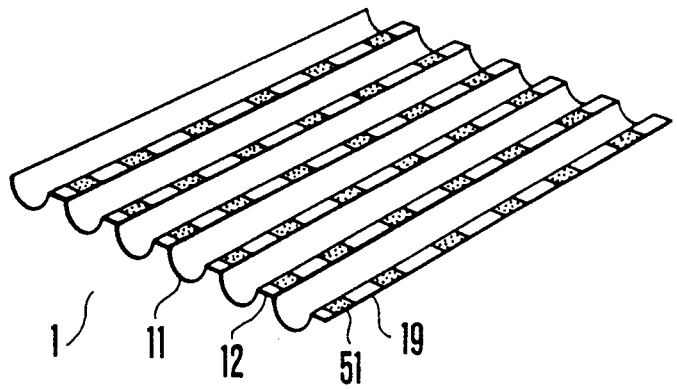
FIG. 10 is a perspective view of a filtering material showing a fourth embodiment of the present invention.
Figure 11:
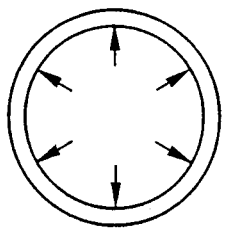
FIG. 11 is a view showing operation of a fluid to be filtered.

FIG. 10 shows a fourth embodiment of the present invention. With this embodiment, when joining the two sheets of corrugated filtering materials, 1, 2 at their valley portions 12, 22, an adhesive 51 is not applied all over the surface of the valley portions 12, but partially applied to leave non-bonded regions 19. This allows the non-bonded regions 19 to exhibit a filtering function as well, so that the effective filtration area is increased to improve filter performance.

In the foregoing embodiments, the fluid passages 3 and the openings left between the fluid passages 3 are closed using the adhesives 52, 53 as shown in FIG. 4. Such closing can be performed in other manners as shown in FIGS. 14 to 18.

Figure 14:
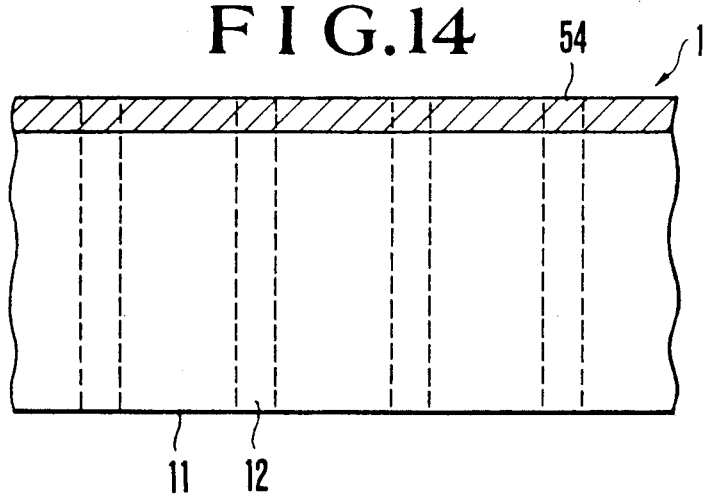
FIGS. 14 and 15 are plan and perspective views of a corrugated filtering material, respectively.
Figure 15:
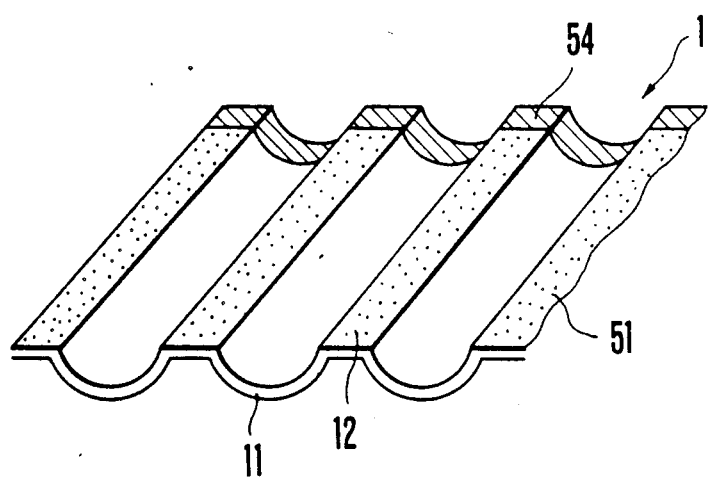
Figure 17A:
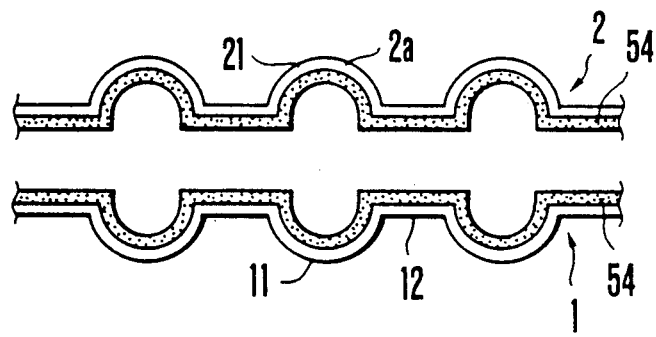
FIG. 17A and 17B are front views showing the state of two corrugated filtering materials before and after bonding therebetween, respectively.

More specifically, as shown in FIGS. 14 and 15, an adhesive sheet 54 made of a polyamide hotmelt adhesive is tentatively bonded to one end of the corrugated filtering materials 1, 2 beforehand by hot pressing or so. Here, the adhesive sheet 54 is formed to be 100 $\mu$ thick. The corrugated filtering material 1 concerned in obtained using a corrugated roller or the like to shape a belt-like flat filtering material 1 with the adhesive sheet 54 tentatively bonded to one end thereof, for forming mountain portions 11 each having a substantially semicircular shape in cross-section and flat valley portions 12. The resulting corrugated filtering material 1 and another corrugated filtering material 2 similarly formed are placed one above the other, and then bonded to each other at their valley portions 12, 22 using the adhesive 51. Subsequently, as shown in FIGS. 17(a) and 17(b), the one ends of the filtering materials are hot-pressed for mutual adhesion of the adhesive sheets 54 on both the materials, thereby closing the fluid passages 3.

Figure 16:
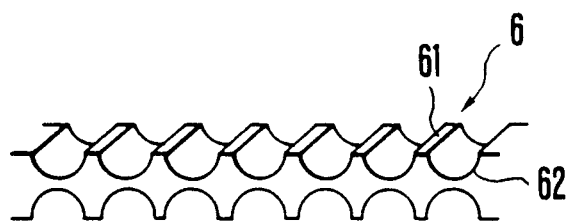
FIG. 16 is a perspective view of an adhesive member.

The openings left between the fluid passages 3 can be sealed by putting a polyamide adhesive member 6, which is formed into a corrugated shape on both sides as shown in FIG. 16, between the fluid passages 3 at the inlet side while the filtering materials are being rolled, and then fusing the adhesive member 6 to the opposite ends of the filtering materials under heating by hot air or so. More specifically, the adhesive member 6 has a corrugated shape comprising mountain or top portions 61 and valley or bottom portions 62 which correspond to the mountain portions 11, 21 and the valley portions 12, 22 of the corrugated materials 1, 2, respectively. When rolled into a spiral shape, the fluid passages 3 are fitted in the respective valley portions 62. The openings left between the fluid passages 3 can thus be sealed by fusing under heating.

Figure 17B:
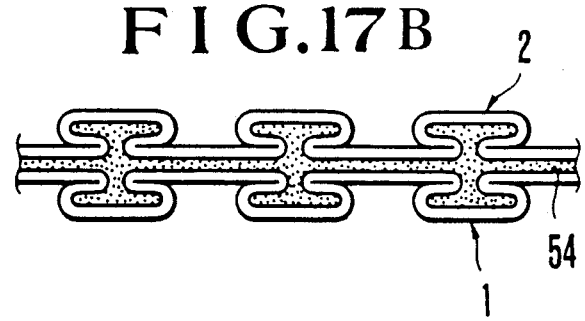
Figure 18:
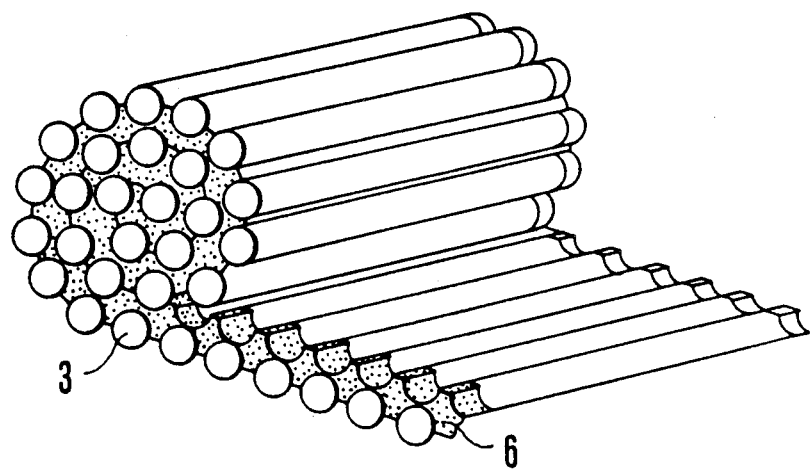
FIG. 18 is a perspective view showing another embodiment of the manufacturing process of the filter element of the present invention.

Although the bonding method shown in FIG. 4 accompanies a fear of hot allowing the adhesive to be applied to every corner of the tubular spaces and causing partial sealing failure, the method of using the adhesive sheets 54 and bonding them by hot pressing as shown in FIG. 17b makes it possible to close the fluid passages 3 with high reliability and facilitate the manufacture technique.

As to sealing of the openings left between the fluid passages 3, although the foregoing method also has a fear of causing partial sealing failure at the small gaps between the fluid passages close to each other, use of the adhesive member 6, having a predetermined width and corrugated corresponding to the sealed openings left between the fluid passages when the filtering materials are rolled into a spiral shape, can provide perfect sealability and simplify the bonding steps.

The adhesive sheet 54 and the adhesive member 6 are not limited to the polyamide adhesive referred above, and may be formed of another polyester or urethane hotmelt adhesive, or epoxy or polyurethane heat-setting flexible adhesive.

Figure 19:
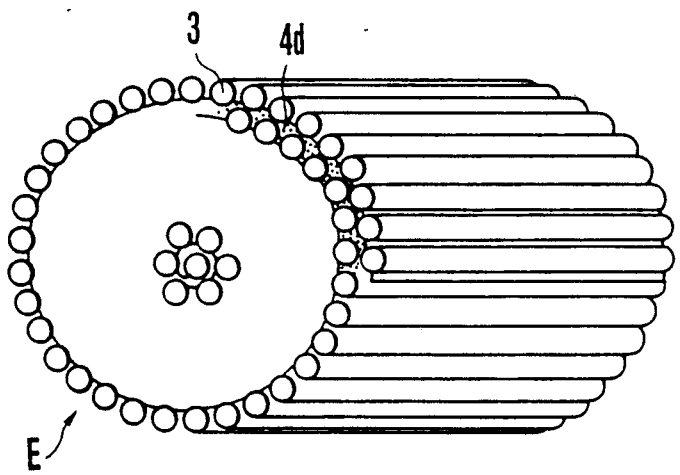
Figure 20:
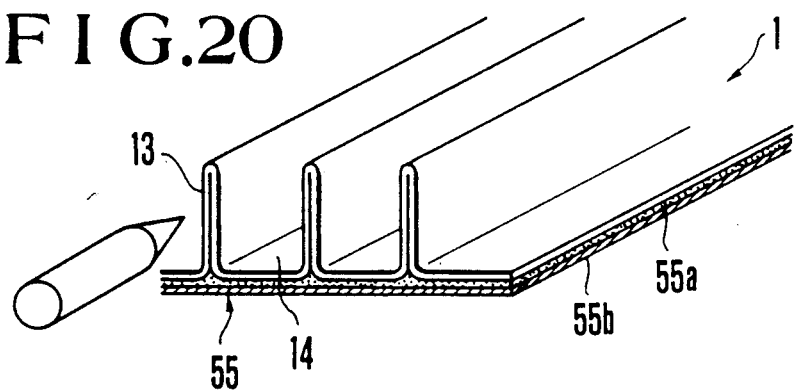
Figure 21:
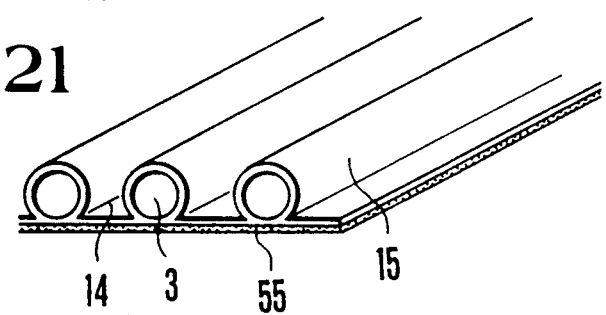

FIGS. 19 to 21 show a fifth embodiment of the present invention. With the fifth embodiment, as shown in FIG. 20, one sheet of filtering material 1 is shaped to form superposed portions 13 each comprising a predetermined partial region of the filtering material folded to superpose with each other, and flat connecting portions 14 to interconnect the adjacent superposed portions 13, these two portions 13 and 14 lying alternately.

A polyamide hotmelt adhesive sheet 55 is then overlaid and joined to the filtering material 1 on the flat side. The adhesive sheet 55 is comprised of an adhesive 55a and a support material 55b.

Thereafter, a pin having a circular cross-section is inserted between the filtering material pieces of each superposed portion 13 to form a tube 15 having therein a tubular flow passage 3, as shown in FIG. 21.

As with the first embodiment shown in FIG. 4, the filtering material having a multiplicity of tubes 15 or flow passages 3 is rolled in a direction transverse to the axes of the flow passages 3, thereby forming a filter element in a spiral shape.

Figure 22:
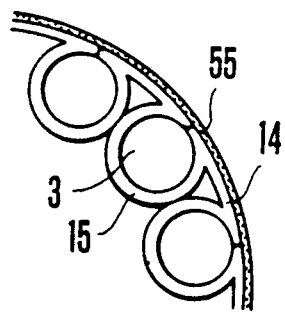
FIGS. 22 and 23 are fragmentary enlarged views of the filter element of FIG. 19.
Figure 23:
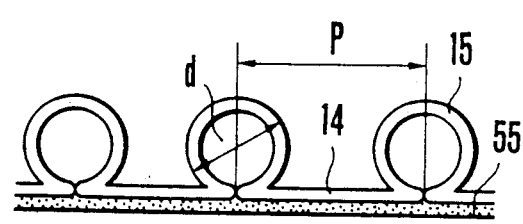
Figure 24A:
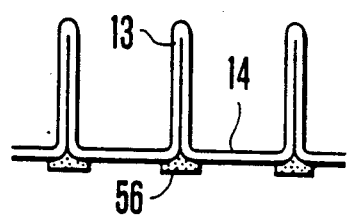
FIGS. 24A and 24B are views showing the manufacture process according to a sixth embodiment of the present invention.
Figure 24B:
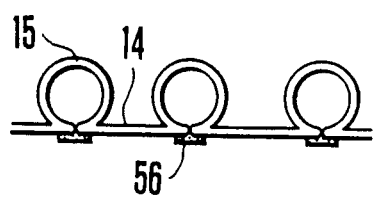
Figure 25A:
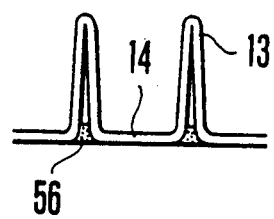
FIGS. 25A and 25B are views showing the manufacturing process according to a seventh embodiment of the present invention.
Figure 25B:
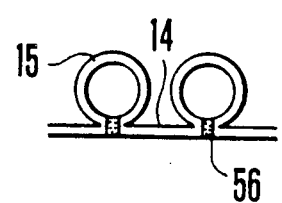

At this time, the filtering material can be rolled with the tubes 15 lying on the inner side, allowing the adjacent tubes 15 to be arranged in contact with each other, as shown in FIG. 22. Specifically, by setting the length of the connecting portions 14 to satisfy the relationship of $P \approx d + \alpha$, where d is the diameter of the tube, $\alpha$ is the minimum distance between tubes when laid flat as in FIG. 23 and P is the center-to-center pitch of the tubes as indicated in FIG. 23, there can be obtained the structure in which the flow passages 3 are closely contiguous with each other when rolled into a spiral shape, enabling to ensure the maximum filtration are for the same volume. Note that $\alpha$ is determined in the stage of design dependent on the curvature of the spiral shape.

Figure 28A:
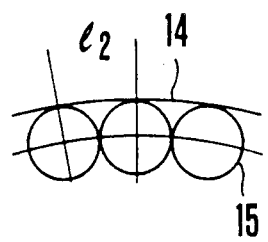
FIGS. 28A and 28B are schematic views showing the state of fluid passages on the inner and outer peripheral sides of the tubular assembly in FIG. 22, respectively.
Figure 28B:
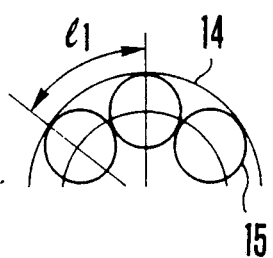

In other words, those tubes 15 rolled on the inner side as shown in FIG. 28A is required to have a length $l_1$ of the connecting portions 14 (or center-to-center pitch of the tubes 15) larger than the length $l_2$ of the connecting portions 14 between those tubes 15 rolled on the outer side as shown in FIG. 28B.

Furthermore, in manufacture of the filter element E, since the fluid passages 3 are formed by folding partial regions of the filtering material to provide the superposed portions 13 and joining the flat adhesive sheet 55 thereto, the manufacture steps can be simplified.

FIGS. 24A, 24B and FIGS. 25A, 25B show a sixth and seventh embodiment, respectively, in which after folding one sheet of filtering material, the open ends of the superposed portions 13 are joined by applying an adhesive 56 to only the recesses or gaps therebetween. This contributes to save the amount of adhesive 56 used.

Figure 26:
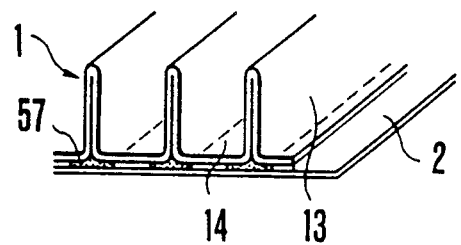
FIGS. 26 and 27 are perspective views showing the filtering materials according to eighth and ninth embodiments of the present invention, respectively.
Figure 27:
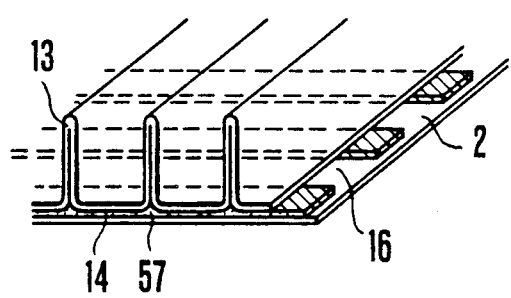

FIG. 26 shows an eighth embodiment in which the adhesive 57 is applied to intermittent regions between the connecting portions 14 of the corrugated filtering material 1 and a flat filtering material 2, parallel to the axes of the superposed portions 13. In a ninth embodiment shown in FIG. 27, the adhesive 57 is applied to intermittent regions extending perpendicular to the axial direction of the superposed portions 13. This embodiment provides non-bonded regions 16 which also serve as the filtering surface to increase the effective filtration area, while saving the amount of adhesive used.

Figure 29:
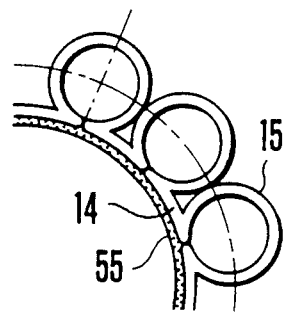
FIG. 29 is a fragmentary enlarged view of the filter element of FIG. 19.

Although the filtering material is rolled with the tubes 15 and the adhesive sheet 15 lying on the inner and outer sides, respectively, in FIG. 22, it may be rolled with the flow passages 3 and the adhesive sheet 15 lying on the outer and inner sides, respectively, as shown in FIG. 29. In this case, by arranging to satisfy the relationship of $P \approx d - \alpha$, where d is the diameter of the tube and P is the center-to-center pitch of the tubes, there can be obtained the structure in which the flow passages are closely contiguous with each other when rolled into a spiral shape.

In that case, however, the superposed portions 13 must be spread out to form the tubes 15 by inserting the pin as shown in FIG. 20, simultaneously with rolling of the filtering material into a spiral shape.

Figure 30:
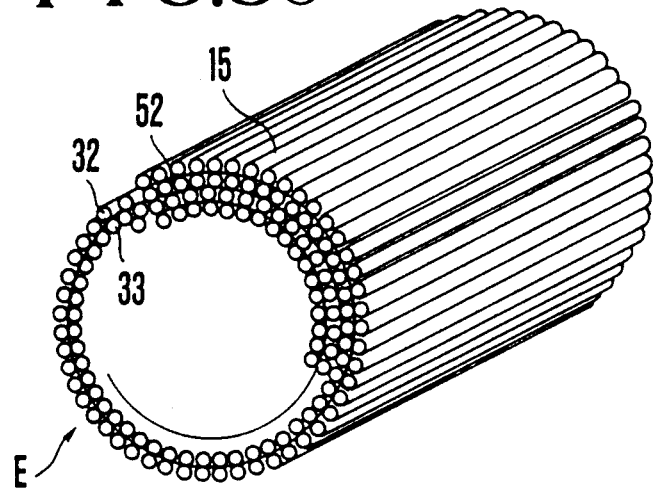
FIG. 30 is an overall perspective view of the filter element according to a tenth embodiment of the present invention.

A tenth embodiment shown in FIG. 30 will now be described.

Figure 31:
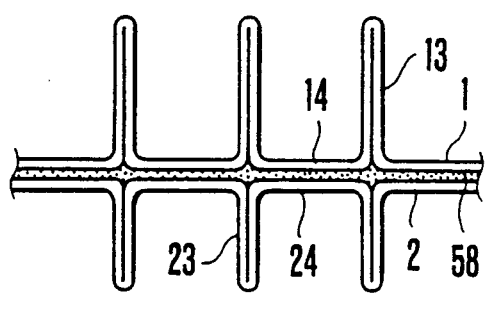
FIGS. 31 and 32 are views showing the manufacture process according to the tenth embodiment.

As shown in FIG. 31, filtering materials 1, 2 are shaped to form superposed portions 13, 23 and connecting portions 14, 24, respectively, which are then bonded to each other by an adhesive 58. Subsequently, the superposed portions 13, 23 are spread out using the tapered pin having a circular cross-section, as shown in FIG. 20, to form tubes 15, 25. Then, as stated above in connection with FIG. 4, fluid passages 32, 33 are sealed at the outlet side to provide the bottom-equipped tubes, and the filtering materials 1, 2 are rolled into a spiral shape while sealing the openings left between the fluid passages 32, 33 by an adhesive 52, thereby obtaining a filter element E.

Figure 32:
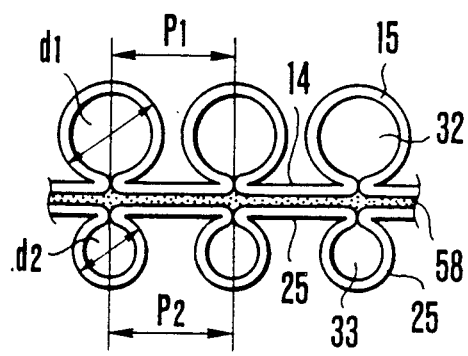

At this time, the diameters d1, d2 of the tubes 15, 25 and the center-to-center pitches P1, P2 of the tubes 15, 25 shown in FIG. 32 are set to satisfy the relationships of $P2 \approx d2 + \alpha$ and $P1 \approx d1 - \alpha$. Here, $\alpha$ is determined in the stage of design dependent on the curvature of the spiral shape.

Figure 33:
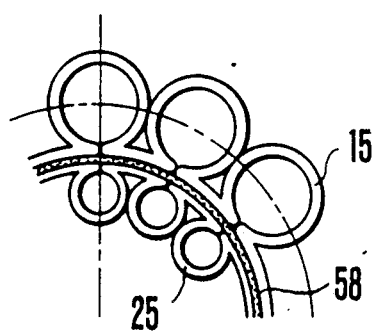
FIGS. 33 and 34 are fragmentary enlarged views of the filter element showing modifications of the tenth embodiment.

Although the adjacent tubes 15, 25 are apart from each other, when rolled into a spiral shape, in the tenth embodiment because of the pitches P1, P2 and the tube's diameters d1, d2 set to larger values, it is also possible to arrange the tubes 15, 25 in close contact relation by proper setting of the above parameters, as shown in FIG. 33, resulting in that the maximum filtration area per unit volume can be ensured to achieve the maximum efficiency.

Figure 34:
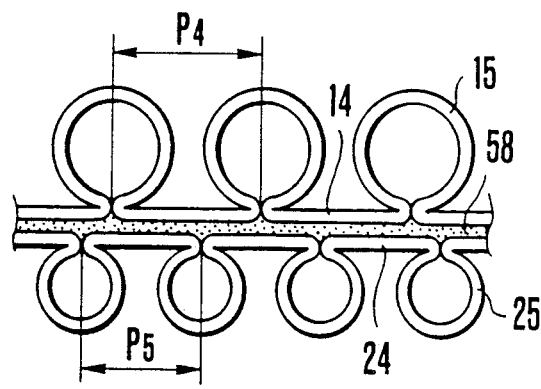

Alternatively, as shown in FIG. 34, the pitches of the tubes 15, 25 are not necessarily equal to each other, and can be set dissimilar as indicated at P4, P5 such that the pitch P4 is larger than pitch P5, for example.

Figure 35A:
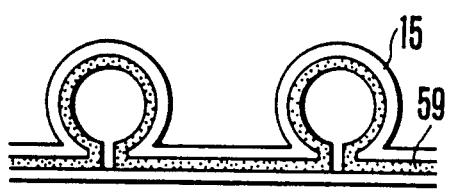
FIGS. 35A and 35B are views showing the bonding steps to close the fluid passages.
Figure 35B:
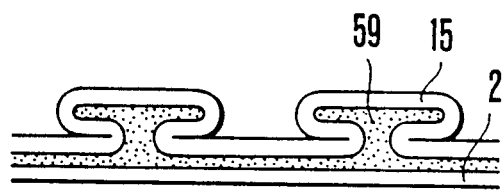
Figure 36:
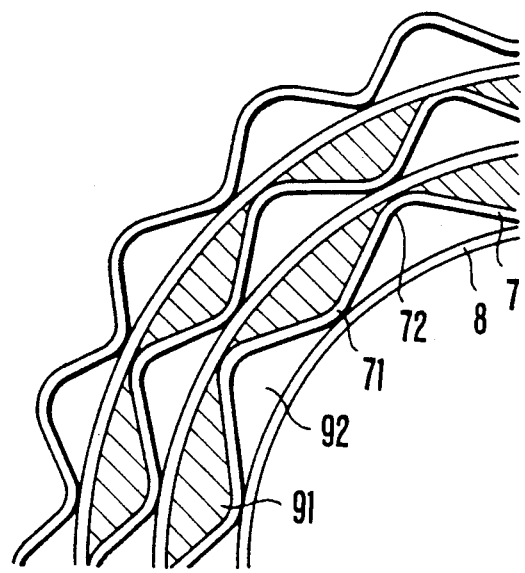
FIGS. 36 and 37 are fragmentary enlarged views of a prior art filter element.
Figure 37:
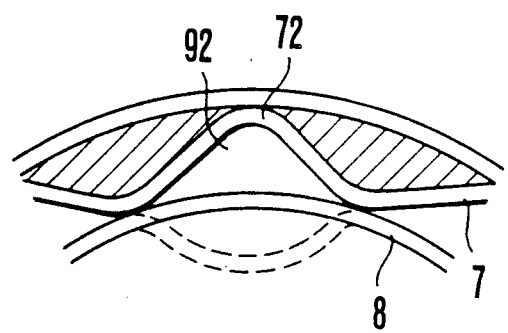

In addition, the foregoing embodiments may be modified as shown in FIGS. 35A and 35B. Specifically, adhesive sheets 59 are bonded to the inner peripheral surfaces of the tubes 15 and/or 25 at one of the ends thereof, and the tubes 15 and/or 25 are hot-pressed to fuse the adhesive sheets 59 for closing the fluid passages 32, 33 defined in the tubes 15, 25.

Although the foregoing embodiments have been explained as forming the tubes 15, 25 by inserting the tapered pin having a circular cross-section, they can be formed in such other manners as blasting compressed air, or pressing the superposed portions 12, 23.

It will be understood that while the plurality of fluid passages 3 are all formed to have the same diameter in the foregoing embodiments, the diameter of the fluid passages 3 can be made different in some partial regions within the scope of the present invention. This modification enables to partially change the rate of filtration for providing regions with filter performance different from each other.

Furthermore, the cross-section of the flow passages 3 may be of an elliptical, oval or polygonal shape. Also, the cross-section of the tubular assembly obtained by rolling one or more filtering materials into a spiral shape is not limited to a circular shape, and may be of an elliptical, oval or polygonal shape.

What is claimed is:

1. A filter element comprising;
    a multiplicity of tubes each formed of a filtering material of substantially uniform thickness and having a substantially circular shape in cross-section and being arranged side by side into a tubular assembly with longitudinal axes of said tubes lying parallel to one another to form inter-tube openings;

the inter-tube openings being closed at only one end of said tubular assembly which end serves via intra-tube openings as the inlet side for a fluid to be filtered, intra-tube openings on the opposite end of said tubular assembly being closed; and the total cross-sectional area of all the inter-tube openings being smaller than the total cross-sectional area of all the intra-tube openings, but larger than the minimum cross-sectional area of a path through which the fluid is supplied to said inlet side intra-tube openings.

2. A filter element according to claim 1, wherein said filter element is used in a fuel filter, and the outer diameter of said tube is set in a range of from 1.5 mm to 2.5 mm.

3. A filter element comprising;

a plurality of tubes each formed of at least one filtering material of substantially uniform thickness and having a substantially circular shape in cross-section, and connecting portions interconnecting said adjacent tubes, said tubes being disposed in a spiral configuration to provide a tubular assembly with the longitudinal axes of said tubes arranged side by side parallel to one another to form inter-tube openings, the inter-tube openings being closed at one end of said tubular assembly which end serves via intra-tube openings as the inlet side for a fluid to be filtered, intra-tube openings on the opposite end of said tubular assembly being closed.

4. A filter element according to claim 3, wherein the total cross-sectional area of all the inter-tube openings is set smaller than the total cross-sectional area of all the intra-tube openings, but larger than the minimum cross-sectional area of a path through which the fluid is supplied to said filter element.

5. A filter element according to claim 4, wherein the distance l2 between mountain or top portions of said tubes lying on the outer side is made smaller than the distance l1 between mountain or top portions of said tubes lying on the inner side, when rolled into a spiral shape, for allowing adjacent ones of said tubes to contact with each other.

6. A filter element according to claim 3, wherein said connecting portions are offset toward the outer periphery side from the radially midpoint between said tubes for making said tubes close to each other.

7. A filter element according to claim 6, wherein adjacent ones of said tubes are made contact with each other following the relationship of $P \approx d + \alpha$, where d is the outer diameter of said tube, P is the center-to-center pitch of said tubes, and $\alpha$ is the curvature of said rolled spiral shape.

8. A filter element according to claim 3, wherein said filter element is used in a fuel filter, and the outer diameter of said tube is set in a range of from 1.5 mm to 2.5 mm.

9. A filter element according to claim 3, wherein said tubes and said connecting portions are integrally made from a piece of said filtering material in such a manner that both ends of adjacent connecting portions are connected to each other by a fixing material so that a remaining portion of said filtering material between said adjacent connecting portions makes said tube.

10. A filter element for filtering fluid supplied from a supplying path wherein:

two sheets of corrugated filtering materials each having a substantially uniform thickness and being formed with mountain portions and valley portions, laid one above the other said sheets being superposed with their mountain portions extending in opposite direction and joined at said respective valley portions to each other;

said joined sheets being disposed in configuration to form a tubular assembly which includes a multiplicity of fluid passages each having a substantially circular shape in cross-section and arranged side by side with the axes of said fluid passages lying parallel to one another and filtrate passages formed between said fluid passages; the openings of said filtrate passages being closed at one end face of said tubular assembly, the openings of said fluid passages being closed at the other end face of said tubular assembly;

the mountain portions of one of said sheets which lies radically further out in said spiral configuration than the other sheet having a larger circumferential length than the mountain portions of said other sheet;

a total cross-sectional area of all of said filtrate passages being smaller than a total cross-sectional area of all of said fluid passages.

11. A filter element according to claim 10, wherein the ratio of circumferential length of the mountain portions of said filtering material lying on the inner side to circumferential length of the mountain portions of said filtering material lying on the outer side is set to become smaller in the inner peripheral side than in the outer peripheral side of said spiral shape.

12. A filter element according to claim 11, wherein said filtering materials are each divided into plural zones such that the number of said flow passage is increased gradually toward the outer periphery of said spiral shape, and said ratio is set different for each zone.

13. A filter element according to claim 10, wherein said two sheets of filtering materials are partially joined to each other for leaving non-bonded regions in said valley portions.

14. A filter element according to claim 10, wherein adhesive sheets are tentatively bonded to the ends of said two filtering materials at the other end face, and both those ends of said filtering materials are hot-pressed to fuse said adhesive sheets to each other for closing said flow passages.

15. A filter element for filtering fluid supplied from a supplying path, comprising:

a multiplicity of tubes of a filtering material having a substantially uniform thickness, said tubes having a substantially circular cross-sectional shape, said tubes being arranged side by side to be a tubular assembly having an axis substantially parallel to an axis of said tube, so that a plurality of spaces are formed within said tubular assembly between said tubes, one end of said tubes being open to said supplying path and another end of said tubes being closed so that fluid passages to which the fluid from the supplying path is introduced is formed within said tubes, an end of said spaces which corresponds to said one end of said tubes being closed and another end of said spaces being open to form filtrate passages to which the fluid from said fluid passage flows through said filtering material in such a manner that the fluid penetrates through a whole surface of said tubes;

a total cross-sectional area of all of said filtrate passages being smaller than a total cross-sectional area of all of said fluid passages.

16. A filter element according to claim 15, wherein adjacent tubes are connected with each other by a connecting portion.

17. A filter element comprising:

a multiplicity of tubes each formed of a filtering material of substantially uniform thickness and being arranged side by side into a tubular assembly with longitudinal axes of said tubes lying parallel to one another to form inter-tube openings;

the inter-tube openings being closed at only one end of said tubular assembly which end serves via intra-tube openings as the inlet side for a fluid to be filtered, intra-tube openings on the opposite end of said tubular assembly being closed; and the total cross-sectional area of all the inter-tube openings being smaller than the total cross-sectional area of all the intra-tube openings, but larger than the minimum cross-sectional area of a path through which the fluid is supplied to said inlet side intra-tube openings.

18. A filter element comprising:

a plurality of tubes each formed of at least one filtering material of substantially uniform thickness, and connecting portions interconnecting said adjacent tubes, said tubes being disposed in a spiral configuration to provide a tubular assembly with the longitudinal axes of said tubes arranged side by side parallel to one another to form inter-tube openings, the inter-tube openings being closed at one end of said tubular assembly which end serves via intra-tube openings as the inlet side for a fluid to be filtered, intra-tube openings on the opposite end of said tubular assembly being closed.

19. A filter element for filtering fluid supplied from a supplying path wherein:

two sheets of corrugated filtering materials each having a substantially uniform thickness and being formed with mountain portions and valley portions, laid one above the other said sheets being superposed with their mountain portions extending in opposite direction and joined at said respective valley portions to each other;

said joined sheets being disposed in a spiral configuration to form a tubular assembly which includes a multiplicity of fluid passages each having a substantially circular shape in cross-section and arranged side by side with the axes of said fluid passages lying parallel to one another and filtrate passages formed between said fluid passages; the openings of said filtrate passages being closed at one end face of said tubular assembly, the openings of said fluid passages being closed at the other end face of said tubular assembly;

the mountain portions of one of said sheets which lies radically further out in said spiral configuration than the other sheet having a larger circumferential length than the mountain portions of said other sheet;

a total cross-sectional area of all of said filtrate passages being smaller than a total cross-sectional area of all of said fluid passages.

20. A filter element for filtering fluid supplied from a supplying path, comprising:

a multiplicity of tubes of a filtering material having a substantially uniform thickness, said tubes being arranged side by side to be a tubular assembly having an axis substantially parallel to an axis of said tube, so that a plurality of spaces are formed within said tubular assembly between said tubes, one end of said tubes being open to said supplying path and another end of said tubes being closed so that fluid passages to which the fluid from the supplying path is introduced is formed within said tubes, an end of said spaces which corresponds to said one end of said tubes being closed and another end of said spaces being open to form filtrate passages to which the fluid from said fluid passage flows through said filtering material in such a manner that the fluid penetrates through a whole surface of said tubes;

a total cross-sectional area of all of said filtrate passages being smaller than a total cross-sectional area of all of said fluid passages.

* * * * *